US012656142B2

(12) United States Patent
Cheng et al.

(10) Patent No.: US 12,656,142 B2
(45) Date of Patent: Jun. 16, 2026

(54) DISPLAY CONTROL DEVICE AND DISPLAY CONTROL METHOD

(71) Applicant: Rakuten Group, Inc., Tokyo (JP)

(72) Inventors: Kelvin Ka Sin Cheng, Tokyo (JP); Kensuke Koda, Tokyo (JP); Madoka Inoue, Tokyo (JP); Koji Nishina, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 18/782,795

(22) Filed: Jul. 24, 2024

(65) Prior Publication Data

US 2025/0035460 A1     Jan. 30, 2025

(30) Foreign Application Priority Data

Jul. 27, 2023     (JP) ................................. 2023-122093

(51) Int. Cl.
  *G01C 21/36*          (2006.01)
(52) U.S. Cl.
  CPC ....... *G01C 21/365* (2013.01); *G01C 21/3602* (2013.01); *G01C 21/3635* (2013.01); *G01C 21/3682* (2013.01); *G01C 21/3697* (2013.01)
(58) Field of Classification Search
  CPC .... G06T 19/006; G01C 21/365; G06V 20/20;
    B60K 2360/177; G06F 3/011; G02B
    27/017; G02B 2027/0178; G02B 27/01;
    B60W 50/14; B60W 2050/146; G05D
    1/0038
  See application file for complete search history.

(56) References Cited

U.S. PATENT DOCUMENTS

| | | | |
|---|---|---|---|
| 2021/0247840 A1* | 8/2021 | Yoon ................... | G02B 27/0093 |
| 2022/0398908 A1 | 12/2022 | Tazume et al. | |
| 2023/0054771 A1* | 2/2023 | Brandon ............ | G01C 21/3407 |
| 2025/0258644 A1* | 8/2025 | Kim ...................... | G06F 3/0481 |

FOREIGN PATENT DOCUMENTS

| | | |
|---|---|---|
| JP | 2022-99338 A | 7/2022 |
| WO | 2021/130980 A1 | 7/2021 |

* cited by examiner

*Primary Examiner* — Kenneth J Malkowski
(74) *Attorney, Agent, or Firm* — Sughrue Mion, PLLC

(57)          ABSTRACT

A display control method includes matching three-dimensional map data that includes reference visual feature points located around a movement route for an unmanned vehicle with visual feature points included in a terminal image that includes an unmanned vehicle object indicating the unmanned vehicle, thereby identifying the unmanned vehicle indicated by the unmanned vehicle object that is included in the terminal image. The terminal image is provided from a terminal device that includes a display. Further, the method includes superimposing and displaying one or more AR-related objects on the terminal image displayed on the display. The AR-related objects indicate related information related to movement of the identified unmanned vehicle.

12 Claims, 7 Drawing Sheets

| Unmanned Vehicle Identifier | Departure Point | Destination | State | Current Speed | Movement Route | Current Position (GPS) | Time to Destination | Distance to Destination |
|---|---|---|---|---|---|---|---|---|
| No.1 | Warehouse A | Building A | Traveling | 4km/h | XXX | 35···, 136··· | 13 Seconds | 15m |
| No.2 | Building B | B's House | Stopped | 0km/h | YYY | 35···, 139··· | 60 Seconds | 60m |
| No.3 | C's House | Warehouse C | Stopped | 0km/h | ZZZ | 38···, 133··· | 30 Seconds | 30m |

DISPLAY CONTROL DEVICE AND DISPLAY CONTROL METHOD

CROSS-REFERENCE TO RELATED APPLICATIONS

This application is based upon and claims the benefit of priority from prior Japanese Patent Application No. 2023-122093, filed on Jul. 27, 2023, the entire contents of which are incorporated herein by reference.

BACKGROUND

1. Field

The present disclosure relates to a display control device and a display control method.

2. Description of Related Art

Japanese Laid-Open Patent Publication No. 2022-99338 discloses an unmanned vehicle that is a mobile body used to deliver items such as goods.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A display control device according to an aspect of the present disclosure includes one or more processors and one or more storage devices that store instructions. The one or more storage devices store three-dimensional map data including reference visual feature points that are located around a movement route for an unmanned vehicle. The one or more processors execute the instructions to perform matching the reference visual feature points with visual feature points included in a terminal image that includes an unmanned vehicle object indicating the unmanned vehicle and includes the visual feature points, thereby identifying the unmanned vehicle indicated by the unmanned vehicle object that is included in the terminal image. The terminal image is provided from a terminal device that includes a display. Further, the one or more processors execute the instructions to perform superimposing and displaying, in real time, one or more augmented reality (AR)-related objects on the terminal image displayed on the display. The one or more AR-related objects indicate related information related to movement of the identified unmanned vehicle.

A display control method according to an aspect of the present disclosure includes matching, by one or more computers, three-dimensional map data that includes reference visual feature points located around a movement route for an unmanned vehicle with visual feature points included in a terminal image that includes an unmanned vehicle object indicating the unmanned vehicle, thereby identifying the unmanned vehicle indicated by the unmanned vehicle object that is included in the terminal image. The terminal image is provided from a terminal device that includes a display. Further, the method includes superimposing and displaying, by the one or more computers, in real time, one or more AR-related objects on the terminal image displayed on the display. The one or more AR-related objects indicate related information related to movement of the identified unmanned vehicle.

A display control method according to an aspect of the present disclosure includes generating a terminal image from an image obtained by capturing an unmanned vehicle by a terminal device that includes a display. The terminal image includes an unmanned vehicle object indicating an unmanned vehicle. The method includes sending, to a display control device, the terminal image generated by the terminal device. The method includes receiving, by the terminal device, a command for superimposing and displaying one or more AR-related objects on the terminal image displayed on the display. The AR-related objects indicate related information related to movement of the unmanned vehicle. The method includes superimposing and displaying, in real time, the one or more AR-related objects on the terminal image according to the command. The terminal image is displayed on the display.

Other features and aspects will be apparent from the following detailed description, the drawings, and the claims.

BRIEF DESCRIPTION OF THE DRAWINGS

FIG. 6 is a diagram showing an example of data elements of the database included in the management server shown in FIG. 4.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the modes, devices, and/or systems described. Modifications and equivalents of the modes, devices, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A display control device, a display control method, a terminal device, and a mobile system for an unmanned vehicle will now be described with reference to the drawings.

First Embodiment

Overall Configuration

Figure 1:
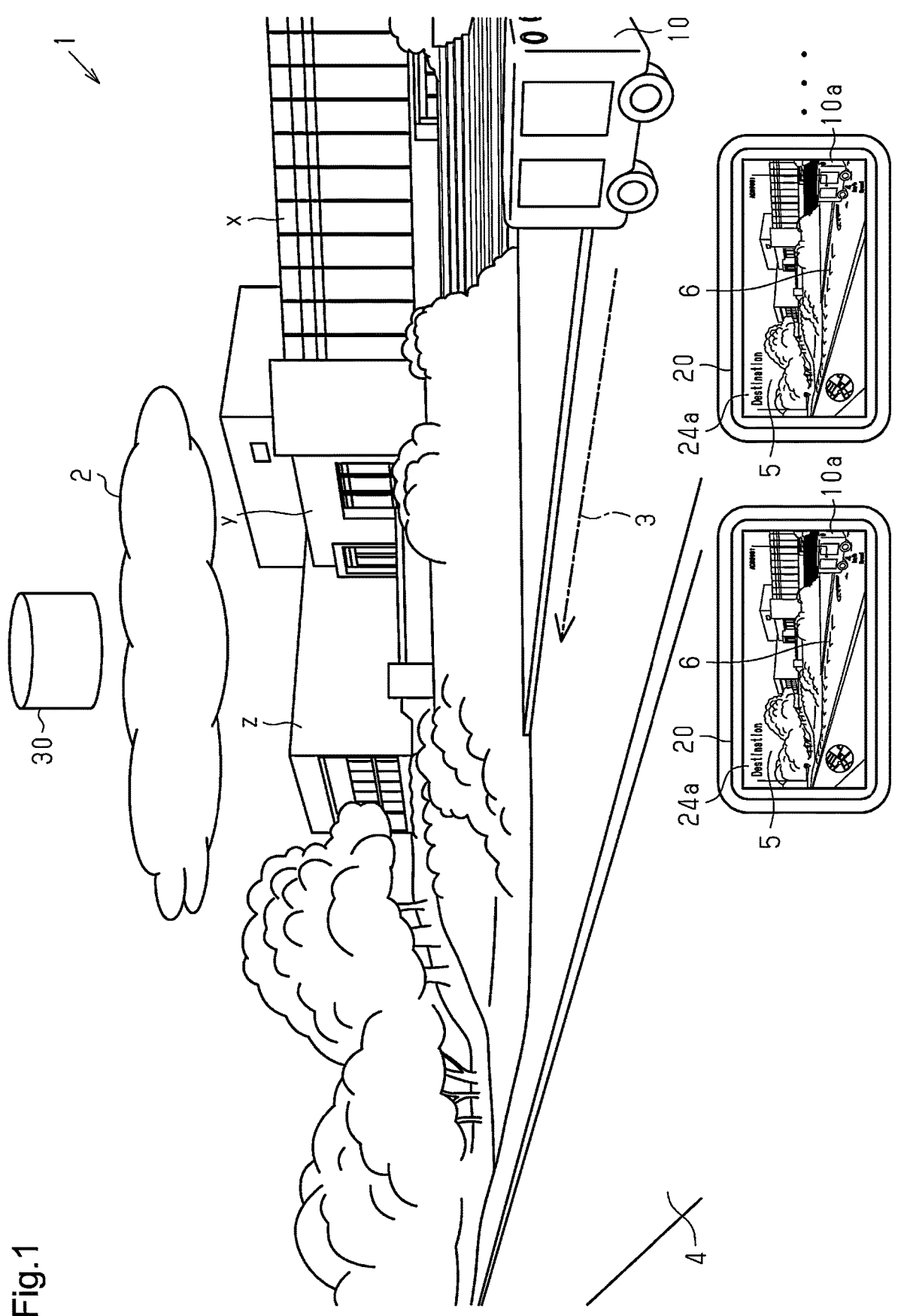
FIG. 1 is a diagram illustrating an example of the configuration of a mobile system for an unmanned vehicle according to an embodiment.

As illustrated in FIG. 1, a mobile system 1 for an unmanned vehicle may include one or more unmanned vehicles 10, one or more terminal devices 20, and one or more management servers 30. In the present disclosure, an example in which the mobile system 1 includes multiple unmanned vehicles 10, one terminal device 20, and one management server 30 is described. The management server 30 is a display control device. The unmanned vehicles 10, the terminal device 20, and the management server 30 are connected to each other via a network 2. The mobile system 1 may include an unmanned vehicle control device (not shown) that is capable of remotely controlling the unmanned vehicles 10 via the network 2.

The network 2 uses, for example, a fifth generation mobile communication system at least in part as its wireless mobile system. The network 2 uses a high-speed, large-capacity, low-latency mobile communication system to enable the exchange of image data, including video, between devices in near real-time. In addition, the network 2 includes, for example, the Internet, a wide area network (WAN), a local area network (LAN), a provider terminal, a wireless communication network, a wireless base station, and a dedicated line.

The communication between the unmanned vehicles 10 and the unmanned vehicle control device, the communication between the unmanned vehicles 10 and the management server 30, and the communication between the management server 30 and the terminal device 20 are performed via the network 2.

The unmanned vehicle 10 is, for example, an unmanned ground vehicle (UGV) that travels on the ground through automatic control without any occupants, including a driver. For example, the unmanned vehicle 10 delivers an item to the position of a delivery destination in accordance with the movement route 3.

The movement route 3 is generated by, for example, an unmanned vehicle control device that controls the movement of the unmanned vehicle 10, and is provided to the unmanned vehicle 10 via the network 2. The movement route 3 connects a departure point, an arrival point, and pickup locations between these points. The movement route 3 is set to, for example, a road 4. The road 4 includes, but is not limited to, a roadway, a sidewalk adjacent to a roadway, a pedestrian pathway, a bicycle lane, and a shared-use path. For example, the unmanned vehicle 10 moves at a speed comparable to walking or cycling. The movement route 3 is preferably set at an end portion of the road 4 in the width direction of the road 4 so as not to obstruct traveling of vehicles, motorcycles, and pedestrians.

The departure point, arrival point, and pickup locations on the movement route 3 are stop positions at which the unmanned vehicle 10 is stopped. Examples of the departure point include, but are not limited to, a stop position for loading items, such as a warehouse. The pickup location is, for example, a stop position such as a dwelling unit, the front of a residential complex, or the front of a building (e.g., an office building), all of which are pickup destinations. At the pickup location, items are received. Examples of the arrival point include, but are not limited to, a parking space provided in a parking lot where the unmanned vehicle 10 is instructed to wait. The arrival point may be the same position as the departure point. The unmanned vehicle 10 is visually recognized by people (e.g., pedestrians or bicycle riders) around the unmanned vehicle 10, particularly while it is moving in a town.

When the unmanned vehicle 10 moves inside a building such as a large-scale residential complex or a large-scale office building, the pickup location in the movement route 3 is, for example, the front of each dwelling unit's entrance in a shared corridor or the front of an office entrance. Examples of the departure point and the arrival point include loading places for delivery items and parking lots.

The terminal device 20 is a portable or small-sized terminal (e.g., a smartphone, a tablet terminal, or a mobile phone) carried by a pedestrian. The terminal device 20 is capable of communicating with other devices via the network 2.

Figure 3:
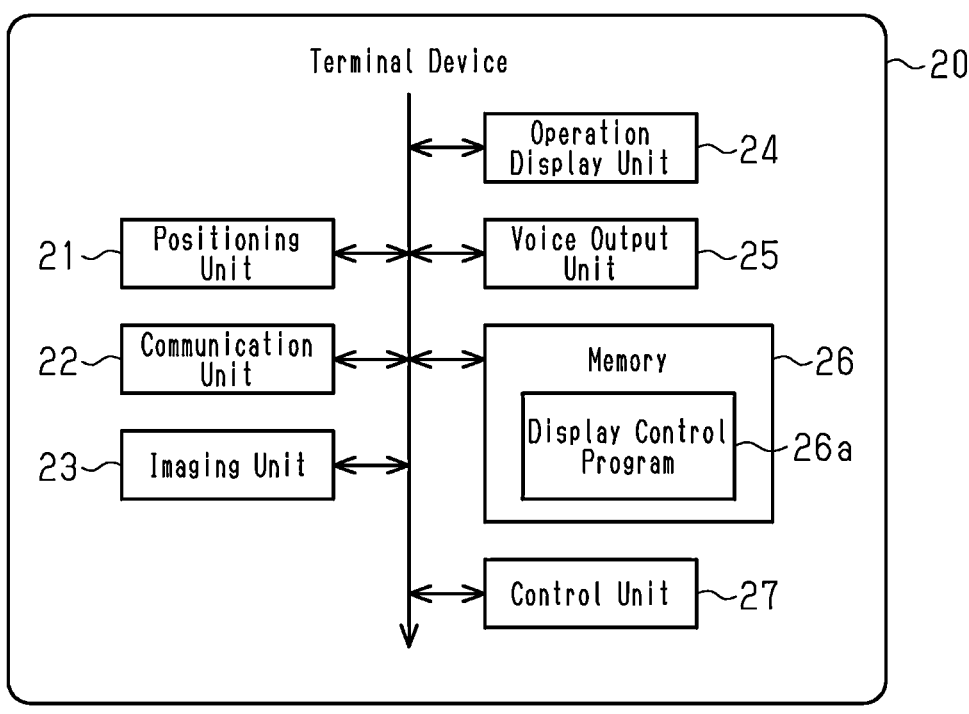
FIG. 3 is a block diagram showing an example of the configuration of the terminal device of FIG. 1.

As illustrated in FIG. 3, the terminal device 20 is a small-sized computer that includes a positioning unit 21, a communication unit 22, an imaging unit 23, an operation display unit 24, a sound output unit 25, a memory 26, and a control unit 27. The imaging unit 23 is, for example, a camera including an image sensor. The operation display unit 24 includes a touch panel with a touch sensor and includes a display 24a (refer to FIG. 1) in which the touch panel is incorporated. Further, application programs are installed in the memory 26 of the terminal device 20.

The application programs include, for example, a camera control program and a display control program 26a. The camera control program is used when an image (a still image or a moving image) is obtained by capturing a general subject with the imaging unit 23.

The display control program 26a of the present disclosure is used when an image including the unmanned vehicle 10 captured by the image sensor of the imaging unit 23 (hereinafter simply referred to as a terminal image 5) is displayed on the display 24a in real time (hereinafter also referred to as live view display). At the same time, the display control program 26a is used when various types of additional information are superimposed and displayed on the terminal image 5. The terminal image 5 may be a continuous series of images or a moving image.

As shown in FIG. 1, when the camera control program is activated, a live view of an image captured by the imaging unit 23 is displayed on the display 24a. When the shutter button object displayed on the display 24a is touched, the image (still image) at that moment is saved to the memory 26.

When the display control program 26a is activated and the imaging unit 23 continuously captures images of the unmanned vehicle 10 and its surrounding environment, the terminal device 20 sends the terminal image 5 captured by the imaging unit 23 to the management server 30 when necessary. The terminal device 20 may send multiple terminal images 5 segmented by predetermined time intervals to the management server 30 in the order of photographing.

The terminal device 20 receives, from the management server 30, a command for displaying one or more augmented reality (AR)-related objects 6 on the terminal image 5 displayed in a live view on the display 24*a*. The AR-related objects 6 indicate related information that is related to the captured unmanned vehicle 10. According to the command, the terminal device 20 superimposes and displays the AR-related objects 6 in real time on the terminal image 5 displayed in a live view on the display 24*a*.

The management server 30 retains three-dimensional map data. The three-dimensional map data includes an image (e.g., a series of images or a moving image) obtained by continuously capturing the movement route 3 of the unmanned vehicle 10 and the environment around the movement route 3 in advance. The three-dimensional map data also includes visual feature points that are associated with the image. The three-dimensional map data is available in, for example, a visual positioning service/system (VPS). Further, the three-dimensional map data is associated with coordinates of a global navigation satellite system (GNSS), for example, coordinates of a global positioning system (GPS).

The management server 30 includes a database 32*b* (refer to FIG. 4) used to manage related information about multiple unmanned vehicles 10. The database 32*b* manages the related information related to each of the unmanned vehicles 10. The related information about each unmanned vehicle 10 includes an unmanned vehicle identifier assigned to a corresponding unmanned vehicle 10. The management server 30 obtains movement-related information that is related to the movement of the unmanned vehicle 10 from each unmanned vehicle 10 via the network 2 or from the unmanned vehicle control device. The movement-related information is managed as related information in the database 32*b*.

The related information includes, but is not limited to, a departure point, a destination, a state (e.g., traveling or stopped), the current speed, a movement route, the current position determined by GPS coordinates, the time needed to reach the destination, and the distance to the destination in each unmanned vehicle 10.

The destination is a next stop position for the unmanned vehicle 10. For example, the destination immediately after the unmanned vehicle 10 departs from the departure point is the initial pickup location for the unmanned vehicle 10. The destination after the unmanned vehicle 10 departs from the initial pickup location is the next pickup location where the unmanned vehicle 10 stops. The destination when the unmanned vehicle 10 departs from the last pickup location is the arrival point. However, even if the unmanned vehicle 10 stops in accordance with a stop signal from a traffic light or the unmanned vehicle 10 temporarily stops to avoid a collision with an obstacle, the stop position does not correspond to the destination.

The management server 30 sequentially obtains the terminal image 5 captured by the terminal device 20 from the terminal device 20 via the network 2. The management server 30 assigns visual feature points to the terminal image 5; more specifically, to each of one or more objects (e.g., a structure such as a building) appearing in the terminal image 5. The management server 30 matches reference visual feature points included in the three-dimensional map data with visual feature points included in the terminal image 5. Based on the matching result, the management server 30 identifies the unmanned vehicle 10 included in the terminal image 5. Then, from the unmanned vehicles 10 managed in the database, the management server 30 determines one unmanned vehicle 10 indicated by the unmanned vehicle object 10*a* included in the terminal image 5. Subsequently, the management server 30 obtains related information related to the unmanned vehicle identifier of the unmanned vehicle 10 (e.g., movement-related information).

The management server 30 sends the obtained related information to the terminal device 20 from which the terminal image 5 has been sent via the network 2. Additionally, the management server 30 receives a command for displaying one or more AR-related objects 6 on the terminal image 5 displayed in a live view on the display 24*a* of the terminal device 20. Each of the AR-related objects 6 indicates corresponding related information.

In this manner, the display 24*a* of the terminal device 20 displays a live view of the terminal image 5 that includes the unmanned vehicle 10 captured by the imaging unit 23. One or more AR-related objects 6 indicating related information are superimposed and displayed on the terminal image 5 according to a command.

Figure 10:
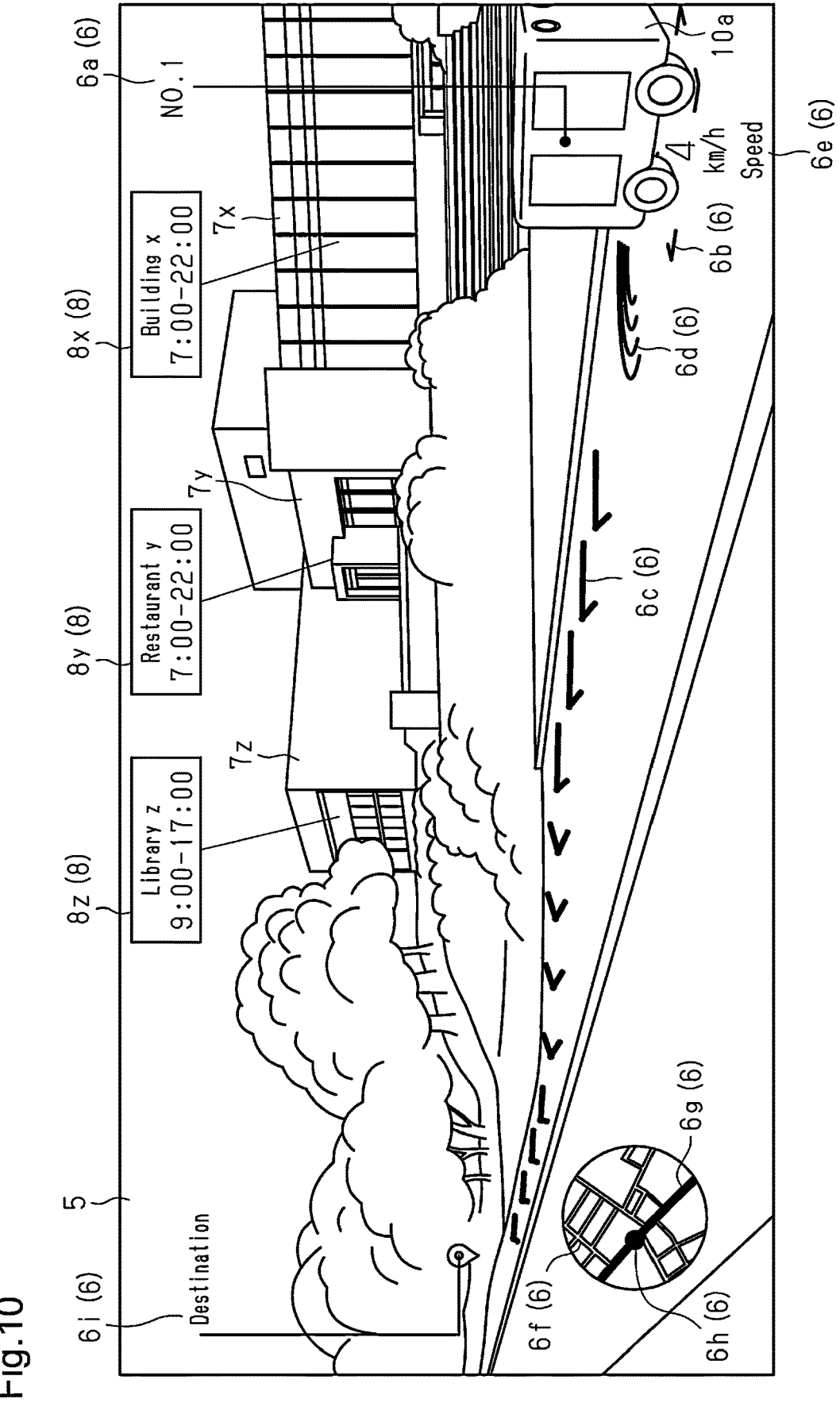
FIG. 10 is a diagram illustrating a terminal image in which AR-related objects are displayed on the display of a user terminal.

As illustrated in FIG. 10, one or more AR-related objects 6 may include a traveling direction display object 6*c* that extends from the unmanned vehicle object 10*a*, included in the terminal image 5, in the traveling direction of the unmanned vehicle object 10*a*. The AR-related objects 6 may include a warning display object 6*d* that indicates a restricted area. The warning display object 6*d* is displayed, for example, in a front area in the traveling direction of the unmanned vehicle object 10*a* included in the terminal image 5 (i.e., the traveling direction of the unmanned vehicle 10 in the terminal image 5). The AR-related objects 6 may include a speed display object 6*e* that indicates the movement speed of the unmanned vehicle 10. The AR-related objects 6 may include a map object 6*f* that includes the movement route 3 for the unmanned vehicle 10. Further, the AR-related objects 6 may include a current position object 6*h* that indicates the current position of the unmanned vehicle 10, which is displayed on the map object 6*f*. For each of visual feature points included in the terminal image 5 and associated with additional information (described later), a corresponding AR additional object 8 may be superimposed and displayed on the terminal image 5.

Unmanned Vehicle 10

Figure 2:
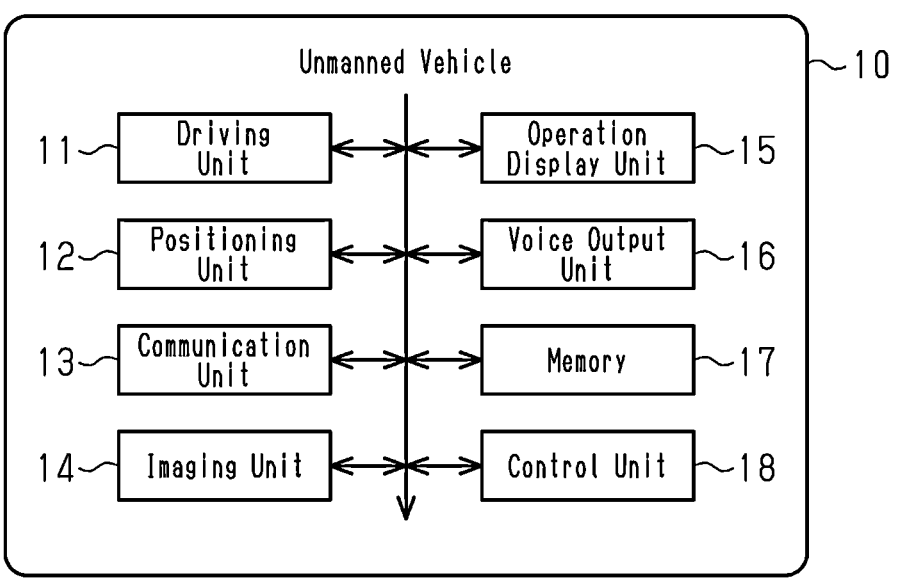
FIG. 2 is a block diagram showing an example of the configuration of the unmanned vehicle of FIG. 1.

As shown in FIG. 2, the unmanned vehicle 10 may include a driving unit 11, a positioning unit 12, a communication unit 13, an imaging unit 14, an operation display unit 15, a sound output unit 16, a memory 17, and a control unit 18. In addition, the unmanned vehicle 10 may include a battery that supplies power to each unit of the unmanned vehicle 10, wheels, and a storage that stores items.

The driving unit 11 includes, for example, a motor, various mechanical mechanisms that transmit a driving force of the motor, and a rotary shaft that is rotated by the driving of the motor. The driving unit 11 drives the motor in accordance with a control signal that has been output from the control unit 18. The wheels of the unmanned vehicle 10 are rotated by the driving force of the motor being transmitted through the rotary shaft.

The positioning unit 12 may include a radio wave receiver. The positioning unit 12 may include, for example, a GPS sensor that receives radio waves transmitted from GPS satellites using a radio wave receiver to detect the current position (latitude and longitude) of the unmanned vehicle 10 from the received radio waves.

The communication unit 13 communicates with the unmanned vehicle control device and the management server 30 via the network 2.

The imaging unit 14 includes, for example, a wide-angle camera such as an omnidirectional camera. The wide-angle camera is used to control the traveling of the unmanned vehicle 10 and monitor the delivery destination of items. The imaging unit 14 continuously captures a real space in an imaging area (capture range) within an angle of view of a wide-angle camera, for example. In particular, the captured moving image of the imaging area is used to detect the recipient of the item and a third party. In addition, the moving image is used to detect an obstacle located on the movement route 3 and detect the state of a traffic light (e.g., detect whether the traffic light is green or red).

The operation display unit 15 includes a display (touch panel) having an input function of receiving an operation of a user who is a recipient and a display function of displaying information. For example, when an unlock code is received from the display by the recipient, the key of the storage is unlocked so that the door can be opened. The sound output unit 16 includes a speaker that outputs sound.

The memory 17 includes a non-volatile memory and stores various programs and data. For example, the memory 17 stores an unmanned vehicle identifier of the unmanned vehicle 10 on which the memory 17 is mounted. The memory 17 further stores a movement plan that is associated with the unmanned vehicle identifier. The movement plan includes, but is not limited to, the movement route 3, the departure date and time, the pickup date and time, the arrival date and time, and the movement speed.

The control unit 18 may include a central processing unit (CPU), a read-only memory (ROM), and a random access memory (RAM).

The CPU executes various processes in accordance with a program stored in the ROM or the memory 17. The control unit 18 obtains a movement plan from the unmanned vehicle control device and stores it in the memory 17. The control unit 18 controls the driving unit 11 in accordance with the movement plan so that the unmanned vehicle 10 autonomously travels. In addition, the control unit 18 sends part of or all of the movement plan and various data, including the current position (GPS coordinates), to the management server 30 via the network 2 in association with the unmanned vehicle identifier of the unmanned vehicle 10 on which the control unit 18 is mounted.

Terminal Device 20

The positioning unit 21 may include a radio wave receiver. The positioning unit 21 may include, for example, a GPS sensor that receives radio waves transmitted from GPS satellites using a radio wave receiver to detect the current position (latitude and longitude) of the unmanned vehicle 10 from the received radio waves.

The communication unit 22 communicates with the management server 30 and a base station via the network 2.

The imaging unit 23 includes, for example, a wide-angle camera such as an omnidirectional camera. The wide-angle camera is a rear camera disposed on a surface opposite to the display 24a, which will be described later. The imaging unit 23 is capable of capturing an image of a subject that is located away from the user. The imaging unit 23 is capable of capturing an image of the unmanned vehicle 10 and the surrounding area of the unmanned vehicle 10.

The operation display unit 24 receives the user's operation through the touch panel. For example, when the shutter button object displayed on the display 24a is touched during execution of the camera control program, a still image is captured. For moving image shooting, when the shutter button object is touched, moving image shooting is started. Further, when the shutter button object is touched again, moving image shooting is stopped. The sound output unit 25 includes a speaker that outputs sound.

The memory 26 includes a non-volatile memory and stores various programs and data. For example, the memory 26 stores a display control program 26a. The display control program 26a includes various commands for sending the terminal image 5 obtained by capturing an image of the unmanned vehicle 10 on a road to the management server 30 and displaying the terminal image 5 on the display 24a in a live view. The display control program 26a includes AR object data used to display one or more AR-related objects 6.

The control unit 27 includes a CPU, a ROM, and a RAM. The CPU executes various processes in accordance with a program stored in the ROM or the memory 26. The control unit 27 operates as a generation unit that generates the terminal image 5 by executing the display control program 26a and as a device control unit that superimposes and displays the AR-related object 6 on the terminal image 5. The control unit 27 generates and displays the data of the captured terminal image 5 on the display 24a, and sends it to the management server 30. Further, upon receipt of a command for displaying the AR-related object 6 from the management server 30, the control unit 27 superimposes and displays, on the terminal image 5 as the AR-related object 6, the related information about the unmanned vehicle 10 that is being captured.

Management Server 30

Figure 4:
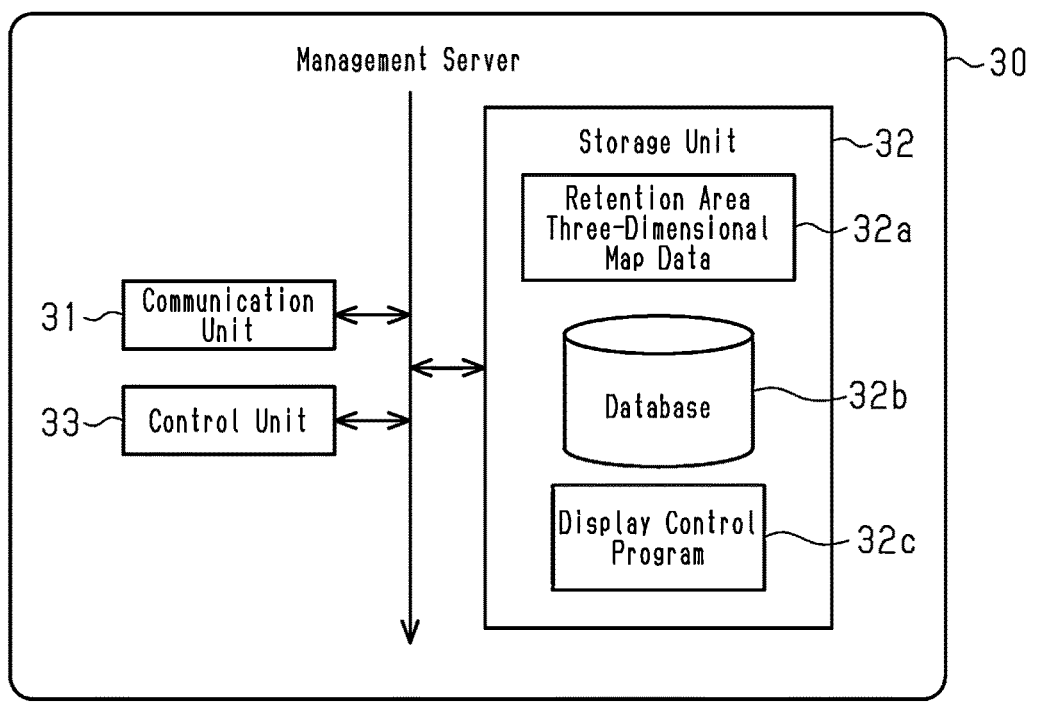
FIG. 4 is a block diagram showing an example of the configuration of the management server of FIG. 1.

As shown in FIG. 4, the management server 30 may be a computer including a communication unit 31, a storage unit 32, and a control unit 33. The communication unit 31 communicates with the unmanned vehicle 10, the terminal device 20, and the unmanned vehicle control device via the network 2.

The storage unit 32 is a storage device that includes, for example, a hard disk drive and a solid-state drive (SSD) and stores various programs and data. For example, the storage unit 32 includes a retention area 32a that stores three-dimensional map data and a database 32b that is used to manage related information about unmanned vehicles 10. Further, a display control program 32c used to superimpose and display the AR-related object 6 on the terminal image 5 is installed in the storage unit 32.

The retention area 32a stores three-dimensional map data including visual feature points extracted from images (a series of still images or a moving image) that are captured in advance such that the map is available in the VPS. The three-dimensional map data includes map data of an area where the unmanned vehicle 10 moves. The three-dimensional map data includes three-dimensional data of structures including real buildings. Each of the visual feature points indicates, for example, a corner of the structure and a boundary of the structure. The visual feature points are also point group data indicating surface positions of objects that make up a city. The three-dimensional map data may include GPS coordinates of each of the visual feature points.

The three-dimensional map data is used for matching with visual feature points extracted from the terminal image 5 that has been sent from the terminal device 20. The visual feature points included in the three-dimensional map data are reference visual feature points for matching with the visual feature points extracted from the terminal image 5. The three-dimensional map data is generated before the unmanned vehicle 10 is instructed to travel along a predetermined movement route 3, and is stored in the retention area 32a.

Figure 5:
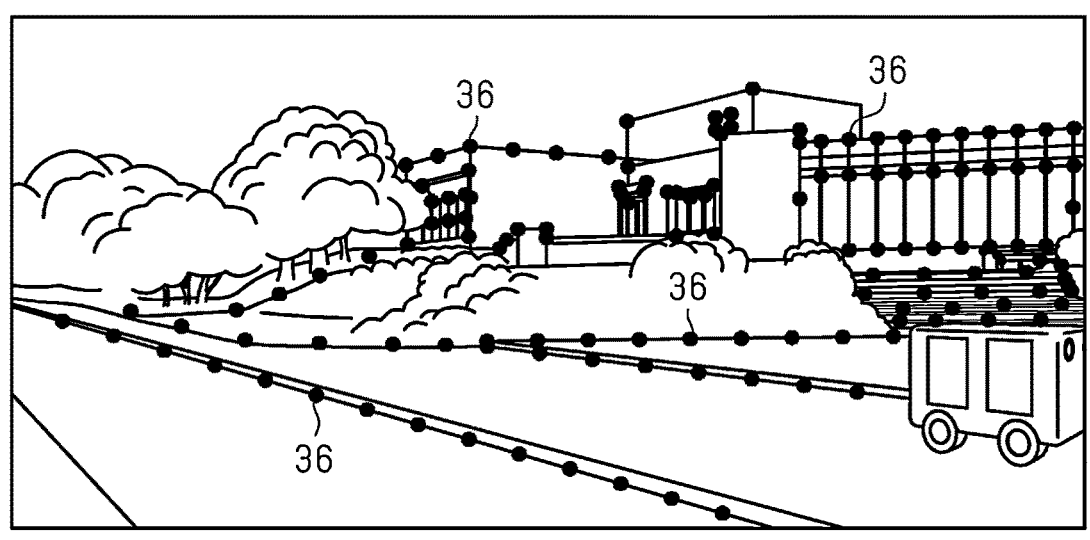
FIG. 5 is a diagram illustrating the three-dimensional map data.

FIG. 5 is a diagram illustrating reference visual feature points 36 that are included in the three-dimensional map data. Each reference visual feature point 36 is an immovable feature point (e.g., a protrusion, a dent, a corner, the boundary between light and shade, a wall, a floor, furniture, or lighting of a building) shown in an image. That is, the reference visual feature point 36 is a fixed point that can be a mark in an area shown in an image.

Additional information may be associated with some of the reference visual feature points 36. The additional information used when the reference visual feature point 36 indicates a predetermined position of building x is, for example, the name of that building. The additional information used when another reference visual feature point 36 indicates a predetermined position of restaurant y is, for example, the name and business hour of that restaurant. The additional information used when a further reference visual feature point 36 indicates a predetermined position of library z is, for example, the business hours of that library.

FIG. 6 shows an example of data elements included in the database 32*b*. The database 32*b* manages the data related to unmanned vehicles 10. A unique unmanned vehicle identifier is assigned to each of the unmanned vehicles 10. The database 32*b* includes movement data that is associated with each unmanned vehicle identifier. The movement data includes, but is not limited to, a departure point, a destination, a state (e.g., traveling or stopped), the current speed, a movement route, the current position determined by GPS coordinates, the time needed to reach the destination, and the distance to the destination.

For example, the current state of the unmanned vehicle 10 with unmanned vehicle identifier No. 1 is traveling, the departure point at that moment is warehouse A, and the destination is building A. The current movement speed is 4 km/h, and the movement route 3 to the destination is XXX. Further, the current position of the unmanned vehicle 10 is 35 . . . , 136 . . . .

The current speed, current position, and state are updated when necessary or at predetermined intervals, based on the data received from the unmanned vehicle 10 or the unmanned vehicle control device. The departure point and destination are updated when a change occurs. For example, when the user arrives at building A, the departure point is set to building A and the destination is set to the next location (e.g., building B). The distance to the destination is calculated, for example, using the distance between the departure point and the destination and using the current position. The distance to the destination is calculated by subtracting, from the distance between the departure point and the destination, the distance from the departure point to the current position. In addition, the time to the destination is calculated from, for example, the movement speed according to the movement plan and the distance to the destination.

The management server 30 obtains the movement plan, including the movement route 3, from the unmanned vehicle 10 or the unmanned vehicle control device. The data managed in the database 32*b* is not limited to that shown in FIG. 6. Data other than that shown in FIG. 6 may be managed in the database 32*b* in association with a corresponding unmanned vehicle identifier.

The control unit 33 includes a CPU, a ROM, and a RAM. The CPU executes various processes in accordance with a program stored in the ROM or the memory 17. For example, the control unit 33 operates as a display control unit by executing the display control program 32*c*. The control unit 33 sequentially obtains terminal images 5 captured by the terminal device 20 from the terminal device 20 through the communication unit 31. To each terminal image 5, the control unit 33 assigns visual feature points extracted from the terminal image 5. The control unit 33 matches reference visual feature points 36 included in the three-dimensional map data with visual feature points included in the terminal image 5. From the matching result, the control unit 33 identifies the unmanned vehicle 10 indicated by the unmanned vehicle object 10*a* included in the terminal image 5.

For example, the control unit 33 determines the GPS coordinates closest to the GPS coordinates of the visual feature points included in the terminal image 5, from the GPS coordinates of the current position associated with each unmanned vehicle identifier managed by the database 32*b*. Then, the control unit 33 determines the unmanned vehicle identifier associated with the GPS coordinates. The control unit 33 identifies the unmanned vehicle 10 indicated by the determined unmanned vehicle identifier, as the unmanned vehicle 10 indicated by the unmanned vehicle object 10*a* included in the terminal image 5. In this manner, the control unit 33 operates as an unmanned vehicle determining unit that determines the unmanned vehicle 10.

The control unit 33 controls the display content of the display 24*a* such that the unmanned vehicle object 10*a* is superimposed on the terminal image 5 displayed on the display 24*a* of the terminal device 20 or the AR-related object 6 is displayed around the unmanned vehicle object 10*a*.

Operation of Unmanned Vehicle 10

Figure 7:
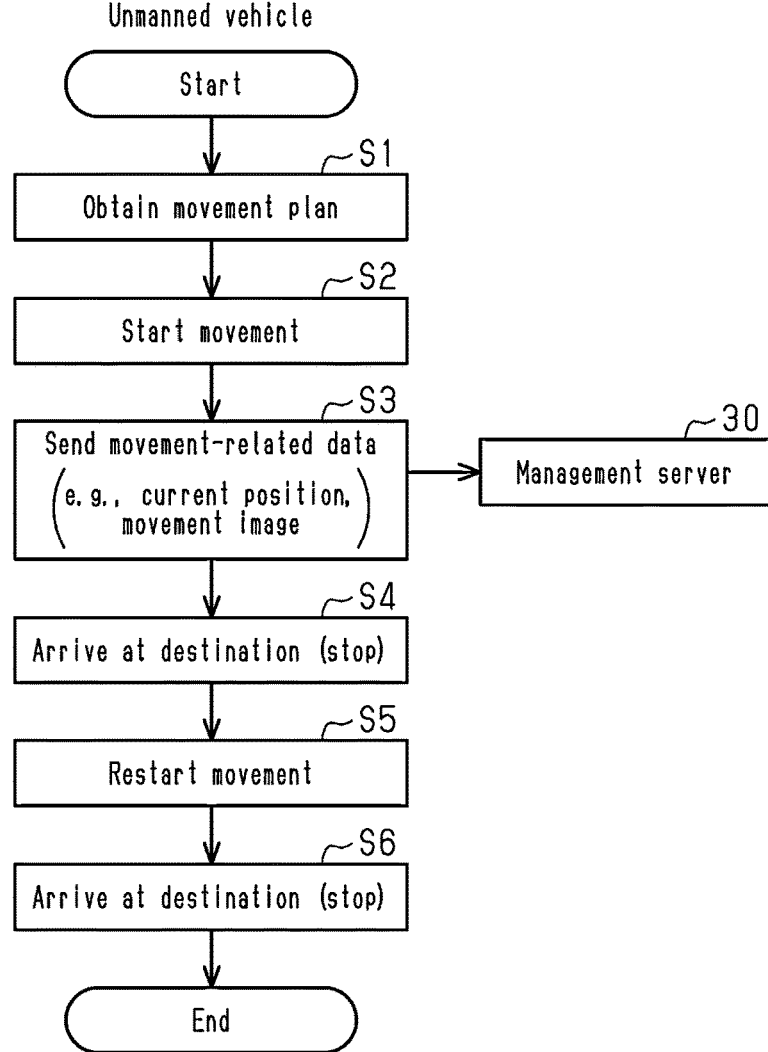
FIG. 7 is a flowchart illustrating a processing procedure of the unmanned vehicle when the unmanned vehicle of FIG. 1 moves.

FIG. 7 is a flowchart of the unmanned vehicle 10 when the unmanned vehicle 10 moves.

In step S1, the control unit 18 of the unmanned vehicle 10 accesses the unmanned vehicle control device to obtain the movement plan including the movement route 3.

In step S2, the unmanned vehicle 10 starts to move from the departure point toward the destination in accordance with the movement plan under the control performed by the control unit 18. After the start of movement, the control unit 18 calculates the current position using the positioning unit 12 when necessary or at predetermined intervals. Further, after the start of the movement, the imaging unit 23 captures the surroundings of the unmanned vehicle 10. The image (e.g., a moving image or a series of still images) captured by the imaging unit 23 when the unmanned vehicle 10 moves is referred to as a movement image.

In step S3, the control unit 18 sends, to the management server 30, movement-related information including the current position (GPS-based coordinates), a movement image, and a state indicating that the unmanned vehicle is traveling or stopped, in association with the unmanned vehicle identifier of the unmanned vehicle 10, when necessary or at predetermined intervals. The process of step S3 is repeatedly executed until the unmanned vehicle 10 arrives at the destination set by a movement program.

While step S3 is repeated, the unmanned vehicle 10 moves in accordance with the movement plan. Then, in step S4, when the unmanned vehicle 10 arrives at the destination, the control unit 18 stops the movement of the unmanned vehicle 10. When an item has been received and the restart time arrives, the control unit 18 restarts the movement of the unmanned vehicle 10 in accordance with the movement plan in step S5.

In step S6, when the unmanned vehicle 10 reaches the destination, the control unit 18 stops the movement of the unmanned vehicle 10. The control unit 18 repeats the processes from steps S2 to S6 until the unmanned vehicle 10 arrives at the destination.

Thus, the unmanned vehicle 10 moves on the road 4 along the movement route 3 in the town while being visually recognized by people (e.g., surrounding pedestrians and bicycle riders) in accordance with the movement plan.

Operation of Management Server 30

Figure 8:
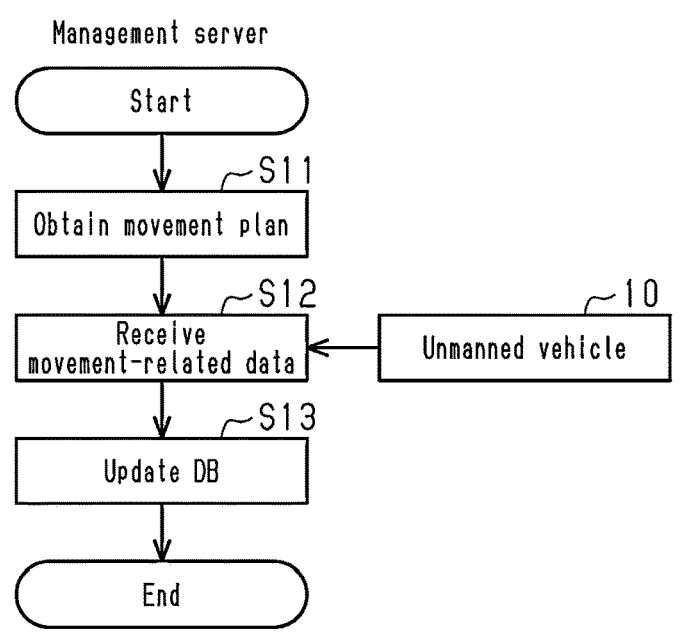
FIG. 8 is a flowchart illustrating a processing procedure of the management server when the unmanned vehicle of FIG. 1 moves.

FIG. 8 is a flowchart illustrating a processing procedure of the management server 30 when the unmanned vehicle 10 moves.

In step S11, the control unit 27 of the management server 30 obtains all of or part of the movement plan, including the movement route 3, from at least one of the unmanned vehicle 10 and the unmanned vehicle control device.

In step S12, the control unit 18 receives the movement-related information sent from the unmanned vehicle 10. In step S13, the control unit 18 updates the database 32b. Specifically, the control unit 18 updates the departure point, the destination, the state, the current speed, the movement route, the current position, the time needed to reach the destination, and the distance to the destination that are associated with the received unmanned vehicle identifier.

Operation of Terminal Device 20

People around a moving unmanned vehicle 10 cannot predict its future behavior, such as the speed at which it will move or the direction it will take. If the behavior of the unmanned vehicle 10 is unknown, people around the unmanned vehicle 10 may feel anxious. By using the terminal device 20 carried by them, people around the unmanned vehicle 10 are able to know the related information about an unmanned vehicle 10 that is visually recognized.

Figure 9:
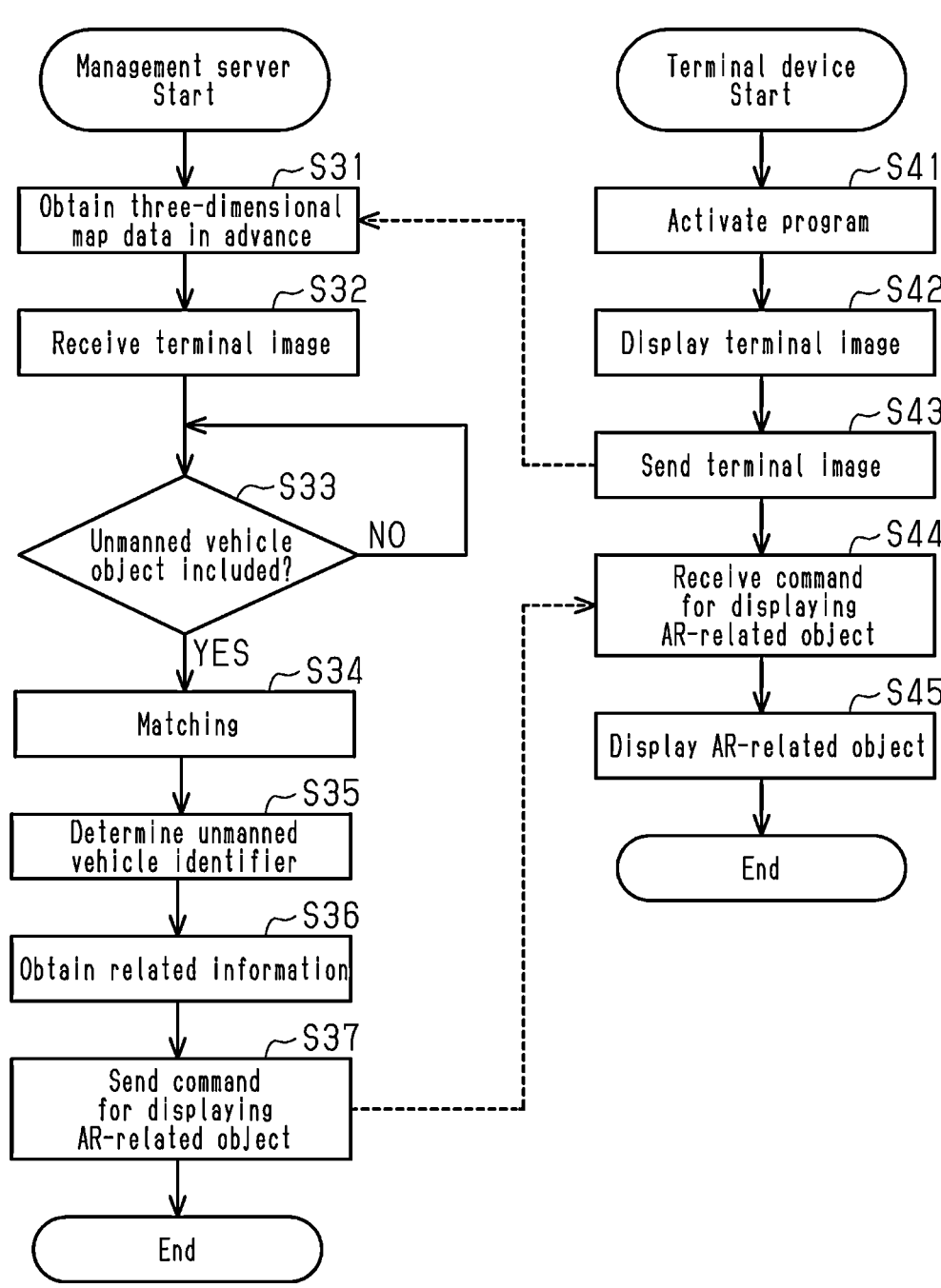
FIG. 9 is a flowchart illustrating a processing procedure of the terminal device capturing an image of the unmanned vehicle and a processing procedure of the management server.

FIG. 9 is a flowchart illustrating a processing procedure of the terminal device 20 capturing an image of the unmanned vehicle 10 and a processing procedure of the management server 30.

In step S31, the control unit 27 stores three-dimensional map data in the retention area 32a before the unmanned vehicle 10 moves. The three-dimensional map data includes reference visual feature points associated with images that have been obtained by continuously photographing the movement route 3 of the unmanned vehicle 10 and the surroundings of the movement route 3 in advance.

When an icon displayed on the display 24a and used to activate the display control program 26a is touched in the terminal device 20, the control unit 27 activates the display control program 26a in step S41. When the imaging unit 23 captures an image of the unmanned vehicle 10, the control unit 27 generates data of the terminal image 5.

In step S42, the control unit 27 displays a live view of the terminal image 5 captured by the imaging unit 23 on the display 24a. In step S43, the control unit 27 sends the terminal image 5 to the management server 30. Typically, the terminal image 5 includes the unmanned vehicle object 10a of an unmanned vehicle 10 being imaged.

Instead of the imaging unit 23 continuously performing photographing, the control unit 27 may generate terminal images 5 by dividing a photographed image (e.g., a moving image) for each determined photographing time. Then, the control unit 27 may send terminal images 5 to the management server 30 in the order of photographing. Instead of all of the terminal images 5 arranged in time order, the control unit 27 may send, to the management server 30, the terminal images 5 extracted at predetermined intervals or the terminal images 5 on which a moving unmanned vehicle 10 is shown.

In step S32, the control unit 33 receives the terminal image 5 sent from the terminal device 20. In step S33, the control unit 33 determines whether the unmanned vehicle object 10a is included in the terminal image 5. When the unmanned vehicle object 10a is included in the terminal image 5, the control unit 33 proceeds to step S34.

In step S34, the control unit 33 assigns visual feature points to the terminal image 5. The control unit 33 matches the reference visual feature points 36 included in the three-dimensional map data with the visual feature points assigned to the terminal image 5. Then, in step S35, the unmanned vehicle 10 indicated by the unmanned vehicle object 10a included in the terminal image 5 is identified from the matching result.

In the matching, for example, the control unit 33 obtains the GPS coordinates of visual feature points of an object (e.g., a building) included in the terminal image 5 based on the GPS coordinates of the reference visual feature points 36. In addition to this or alternatively, the control unit 33 obtains the GPS coordinates of the unmanned vehicle 10 indicated by the unmanned vehicle object 10a based on the GPS coordinates of an object (e.g., a building) located around the unmanned vehicle object 10a. Then, the control unit 33 determines the unmanned vehicle identifier associated with the current position (GPS coordinates) closest to the obtained GPS coordinates of the obtained object, from the GPS coordinates of the current position associated with each of the unmanned vehicle identifiers managed by the database 32b. Alternatively, the control unit 33 determines the unmanned vehicle identifier associated with the current position (GPS coordinates) closest to the obtained GPS coordinates of the unmanned vehicle 10. The control unit 33 identifies the unmanned vehicle 10 corresponding to the determined unmanned vehicle identifier as the unmanned vehicle 10 indicated by the unmanned vehicle object 10a included in the terminal image 5.

In step S36, the control unit 33 accesses the database 32b, obtains related information associated with the determined unmanned vehicle identifier, and sends it to the terminal device 20. For example, the related information sent to the terminal device 20 includes the unmanned vehicle identifier. The related information may include at least one of the traveling direction of the unmanned vehicle 10, the current position of the unmanned vehicle 10, the movement speed, the time needed to reach the destination, the distance to the destination, the movement route 3, and the map object around the current position including the movement route 3.

The traveling direction can be obtained by comparing terminal images 5 arranged in time series with each other. The traveling direction can be determined by, for example, a change in the current position (GPS coordinates).

In step S37, together with such related information, the control unit 33 sends a command for displaying one or more AR-related objects 6 on the display 24a to the terminal device 20 from which the terminal image 5 has been sent.

In step S44, the control unit 27 receives a command for displaying the related information and the AR-related object 6 that have been sent from the management server 30. In step S45, according to the command, the control unit 27 displays the AR-related object 6 on the terminal image 5 displayed on the display 24a at a predetermined position in real time, following a definition in the display control program 26a.

FIG. 10 is an example of the terminal image 5. The terminal image 5 is one of the images obtained by capturing a state in which the unmanned vehicle 10 is traveling on the road 4 along the movement route 3. The terminal image 5 includes the road 4 extending horizontally in the figure, a building object 7x indicating building x, a restaurant object 7y indicating restaurant y, and a library object 7z indicating library z. These objects are arranged along the road 4. The unmanned vehicle object 10*a* is located at the right end of the terminal image 5.

For example, the control unit 27 displays, as an example of the AR-related object 6, an unmanned vehicle identification object 6*a* indicating an unmanned vehicle identifier (e.g., an unmanned vehicle number) of the unmanned vehicle 10 in the terminal image 5. The unmanned vehicle identification object 6*a* may be a character (e.g., a number or an alphabet) or a symbol. The unmanned vehicle identifier is included in the related information and is obtained from the management server 30.

The unmanned vehicle identification object 6*a* is connected by a leader line object from the unmanned vehicle object 10*a*, and is displayed at a position that does not overlap the unmanned vehicle object 10*a*. In FIG. 10, the unmanned vehicle identification object 6*a* is No. 1. This allows the operator of the terminal device 20 to identify the unmanned vehicle 10 indicated by the unmanned vehicle object 10*a*.

The control unit 27 may display a position object 6*b* for the unmanned vehicle object 10*a*. Examples of the position object 6*b* include four L-shaped marks respectively surrounding the four corners of the unmanned vehicle object 10*a*.

When the unmanned vehicle object 10*a* is determined in the terminal image 5, the control unit 27 may display the traveling direction display object 6*c* on the terminal image 5. The traveling direction display object 6*c* extends from the unmanned vehicle object 10*a* in the traveling direction of the unmanned vehicle object 10*a*. The traveling direction display object 6*c* may have a shape, such as an arrow or a triangular mark, indicating the traveling direction. The traveling direction display object 6*c* allows the operator of the terminal device 20 to know the traveling direction of the unmanned vehicle 10 moving nearby.

In the terminal image 5, the control unit 27 may display the warning display object 6*d* in an area in front of the unmanned vehicle object 10*a* in the traveling direction. The warning display object 6*d* may have a shape spreading in the traveling direction from the head of the unmanned vehicle object 10*a* in the traveling direction, for example, the shape of a circular sector. The warning display object 6*d* allows the operator of the terminal device 20 to recognize a restricted area around the unmanned vehicle 10 moving nearby.

The control unit 27 may display the speed display object 6*e* on the terminal image 5. The speed display object 6*e* may be superimposed and displayed on the unmanned vehicle object 10*a*. The speed display object 6*e* represents, for example, a speed per hour using a numeral, a character (e.g., an alphabet), or a symbol. The movement speed of the unmanned vehicle 10 is obtained from the management server 30 as related information. The speed display object 6*e* in FIG. 10 represents 4 km/h. The speed display object 6*e* allows the operator of the terminal device 20 to recognize the movement speed of the unmanned vehicle 10 moving nearby.

The control unit 27 may display, on the terminal image 5, the map object 6*f* including the movement route 3. The map object 6*f* is displayed in the terminal image 5 at a portion that does not overlap the unmanned vehicle object 10*a* (e.g., near a corner of the terminal image 5). The map object of may be a map with a radius of several tens of meters around the current position of the unmanned vehicle 10.

The control unit 27 obtains the map object 6*f* from, for example, a link destination sent from the management server 30. The map object 6*f* may be highly transparent. In this case, the terminal image 5 is seen through the map object 6*f*. This avoids situations in which part of the terminal image 5 is hidden by the map object 6*f*.

The control unit 27 may superimpose and display, on the map object 6*f*, a route object 6*g* of the movement route 3 obtained as related information from the management server 30. The route object 6*g* may be, for example, a line. The objects 6*f*, 6*g* allow the operator of the terminal device 20 to recognize the movement route 3 on the map.

Further, the control unit 27 may display the current position object 6*h*, which indicates the current position of the unmanned vehicle 10, on the map object 6*f*. The current position object 6*h* may be, for example, a mark such as a dot. The current position object 6*h* allows the operator of the terminal device 20 to recognize the current position on the map.

The control unit 27 may display a destination object 6*i*, which indicates the destination of the unmanned vehicle 10, on the terminal image 5. The destination object 6*i* may be a number, a character (e.g., an alphabet), or a symbol. The destination can be obtained from the management server 30 as related information. When the destination is included in the terminal image 5, the destination object 6*i* is connected by a leader line object from an object (e.g., the building of the destination), and is displayed at a position that does not overlap the unmanned vehicle object 10*a*. The destination object 6*i* allows the operator of the terminal device 20 to identify the destination of the unmanned vehicle 10 indicated by the unmanned vehicle object 10*a*.

The three-dimensional map data held by the management server 30 may include additional information that is associated with some reference visual feature points 36. Examples of the additional information include a building name associated with the building object 7*x*, a restaurant name and the business hour associated with the restaurant object 7*y*, or the business hour associated with the library object 7*z*.

According to the command, the control unit 27 may display the AR additional object 8 at a predetermined position on the terminal image 5 displayed on the display 24*a*, following the definition in the display control program 26*a*.

For example, the control unit 27 may display a building additional object 8*x*, which is an AR additional object 8, on the terminal image 5. The building additional object 8*x* is connected by a leader line object from the building object 7*x* and is also displayed at a position that does not overlap the unmanned vehicle object 10*a*. The building additional object 8*x* may display the building name of building x. The building additional object 8*x* allows the operator of the terminal device 20 to know information related to building x as additional information about the surroundings of the unmanned vehicle 10.

The AR additional objects 8 include a restaurant additional object 8*y*. The restaurant additional object 8*y* is connected by a leader line object from the restaurant object 7*y* and is also displayed at a position that does not overlap the unmanned vehicle object 10*a*. The restaurant additional object 8*y* displays, for example, the name and business hour of restaurant y. The restaurant additional object 8*y* allows the operator of the terminal device 20 to know information related to restaurant y as additional information about the surroundings of the unmanned vehicle 10.

The AR additional objects 8 include a library additional object 8*z*. The library additional object 8*z* is connected by a leader line object from the library object 7*z* and is also displayed at a position that does not overlap the unmanned vehicle object 10*a*. The library additional object 8*z* displays, for example, the business hour of library z. The library additional object 8*z* allows the operator of the terminal device 20 to know information related to library z as additional information about the surroundings of the unmanned vehicle 10.

Advantages of Embodiment

As described above in detail, the present embodiment provides the following advantages.

(1-1) People around a moving unmanned vehicle cannot predict its future behavior, such as the speed at which it will move or the direction it will take. As a result, people around the moving unmanned vehicle may feel anxious. In the terminal image 5, the related information related to the unmanned vehicle object 10*a* included in the terminal image 5 is displayed as the AR-related object 6. This alleviates the anxiety of people around the unmanned vehicle 10.

(1-2) The use of VPS determines the current position of an operating unmanned vehicle 10 and the unmanned vehicle identifier of that unmanned vehicle 10. Further, the use of VPS allows various related information managed in association with the unmanned vehicle identifier to be superimposed and displayed on the terminal image 5 as the AR-related object 6.

(1-3) Based on the database 32*b*, the management server 30 can manage the states of unmanned vehicles 10. In the database 32*b*, the current position of each unmanned vehicle 10 is stored as GPS coordinates, and the GPS coordinates are associated with reference visual feature points 36 included in three-dimensional map data. This allows the related information about the unmanned vehicle 10 managed by the database 32*b* to be superimposed and displayed on the terminal image 5 as the AR-related object 6.

(1-4) The traveling direction display object 6*c* is superimposed and displayed on the terminal image 5. This allows the operator of the terminal device 20 to know the traveling direction of the unmanned vehicle 10 moving nearby.

(1-5) The warning display object 6*d*, which indicates a restricted area, is displayed on the terminal image 5 in an area located in the traveling direction of the unmanned vehicle object 10*a*. This allows the operator of the terminal device 20 to recognize a restricted area for the unmanned vehicle 10 moving nearby.

(1-6) The speed display object 6*e*, which indicates the movement speed of the unmanned vehicle 10, is displayed on the terminal image 5. This allows the operator of the terminal device 20 to recognize the movement speed of the unmanned vehicle 10 moving nearby.

(1-7) The map object 6*f* including the route object 6*g* is displayed on the terminal image 5. This allows the operator of the terminal device 20 to recognize the movement route 3 on the map.

(1-8) The current position object 6*h*, which indicates the current position of the unmanned vehicle 10, is superimposed and displayed on the map object 6*f*. This allows the operator of the terminal device 20 to recognize the current position on the map.

(1-9) The AR additional object 8 is superimposed and displayed on the terminal image 5. This allows the operator of the terminal device 20 to know additional information about the surroundings of the unmanned vehicle 10.

(1-10) The network 2 includes a high-speed, large-capacity, low-latency mobile communication system (e.g., the fifth generation mobile communication system). This allows the AR-related object 6 and the AR additional object 8 to be superimposed and displayed on the terminal image 5 in near real time. That is, the AR-related object 6 and the AR additional object 8 can be displayed at appropriate positions in the terminal image 5.

Modifications

Modifications of the above embodiments will now be described.

Modification of Mobile Communication System

The mobile communication system is not limited to the fifth generation mobile communication system and may be, for example, the subsequent generation mobile communication system. That is, another wireless communication may be used if the AR-related object 6 and the AR additional object 8 can be displayed on the terminal image 5 in near real time.

Modification of AR-Related Object 6

In the terminal image 5, an estimated speed or estimated traveling direction for the upcoming travel of the unmanned vehicle 10 may be further superimposed and displayed as an AR-related object 6. For example, an AR-related object 6 indicating a motion (e.g., going straight, turning right, turning left, or pausing) may be superimposed and displayed on the terminal image 5 near the intersection. In addition, an AR-related object 6 indicating backward movement may be displayed near the parking lot.

When the terminal device 20 is located near the current position of the unmanned vehicle 10 and on or near the movement route 3, a warning message object may be superimposed and displayed on the terminal image 5. Further, when the current position of the terminal device 20 is included in the range of the warning display object 6*d* indicating that entry is prohibited, the warning message object may be superimposed and displayed on the terminal image 5. For example, the warning message object is a text message (e.g., "DO NOT ENTER!"). The management server 30 can determine the current position of the terminal device 20 based on VPS or the GPS coordinates of the terminal device 20 sent to the management server 30.

The current position object 6*h* does not have to be displayed on the map object 6*f*. Further, the route object 6*g* does not have to be displayed on the map object 6*f*. For example, only the current position object 6*h* may be displayed on the map object 6*f*. Further, the display of all of the map object 6*f*, the route object 6*g*, and the current position object 6*h* may be omitted.

The display of the speed display object 6*e* may be omitted. Further, the display of the warning display object 6*d* may be omitted.

The display of all the AR-related objects 6 may be switched on or off on the setting screen of the display control program 26*a*. Further, an AR-related object 6 that is to be displayed may be selected from multiple types of AR-related objects 6.

The terminal device 20 may have a sound recognition function. In this case, the terminal device 20 may display the AR-related object 6 by default, and may hide the AR-related object 6 when it recognizes a sound command to delete the display. By contrast, the terminal device 20 may hide the AR-related object 6 by default, and may superimpose and display the AR-related object 6 on the terminal image 5 when recognizing a sound command to display the AR-related object 6. The display of the AR-related object 6 may be switched on or off by the display control program 26a installed in the terminal device 20 or the display control program 32c installed in the management server 30.

The management server 30 may send the AR-related object 6 to the terminal device 20 instead of the command for displaying the AR-related object 6. Further, the management server 30 may send the terminal image 5 on which an AR-related object 6 is superimposed to the terminal device 20, and display the terminal image 5 on the display 24a.

Modification of Additional Object 8

The AR additional object 8 may include an AR advertisement object (e.g., an advertisement for a store that is a tenant in the building or a notification of an event in the neighborhood).

The display of the AR additional object 8 may be omitted.

The display of the AR additional object 8 may be switched on or off on the setting screen of the display control program 26a. In a case in which the terminal device 20 has a sound recognition function, the terminal device 20 may display the AR additional object 8 by default, and may hide the AR additional object 8 when it recognizes a sound command to delete the display. By contrast, the AR additional object 8 may be hidden by default. In this case, the AR additional object 8 may be superimposed and displayed on the terminal image 5 when a sound command to display the AR additional object 8 is recognized. The display of the AR-related object 6 may be switched on or off by the display control program 26a installed in the terminal device 20 or the display control program 32c installed in the management server 30.

The management server 30 may send the AR additional object 8 to the terminal device 20 instead of the command for displaying the AR additional object 8. Further, the management server 30 may send the terminal image 5 on which an AR additional object 8 is superimposed to the terminal device 20, and display it on the display 24a.

Modification of VPS

Simultaneous localization and mapping (SLAM) may be used instead of VPS, or may be used in combination with VPS.

In the mobile system, GNSS does not have to be used. Even in such a case, the position of an unmanned vehicle 10 can be determined through by the process of matching the visual feature points.

Modification of Terminal Device 20

The imaging unit 23 may be a camera that is connected to the body of the terminal device 20 either wired or wirelessly. The display 24a, which displays the terminal image 5, may be a monitor connected to the body of the terminal device 20 either wired or wirelessly.

Modification of Unmanned Vehicle 10

There may be only one unmanned vehicle 10 that is managed by the mobile system.

The unmanned vehicle is not limited to an unmanned vehicle 10 that travels on a road and may be a flying object (e.g., an unmanned aerial vehicle). Further, the unmanned vehicle 10 may be used in a system other than an item delivery system.

Each of the control units 18, 27, 33 is not limited to a control unit that includes a CPU, a RAM, and a ROM and executes software processing. That is, each of the control units 18, 27, 33 only needs to include processing circuitry having any one of the following configurations.

(a) The processing circuitry includes one or more processors that execute various processes in accordance with a computer program. The processor may include a CPU and a memory (e.g., a RAM and a ROM). The memory may store program codes or instructions configured to cause the CPU to execute the processes. The memory, or a computer-readable medium, may include any type of medium that is accessible by general-purpose computers and dedicated computers. The processor may be configured to execute various processes in accordance with a computer program received via a network or the like.

(b) The processing circuitry includes one or more dedicated hardware circuits that execute various processes. Examples of the dedicated hardware circuits include an application specific integrated circuit (ASIC) and a field programmable gate array (FPGA).

(c) The processing circuitry includes a processor that executes part of various processes in accordance with a computer program and a dedicated hardware circuit that executes the remaining processes.

CLAUSES

[Clause 1]
A display control device including:
one or more processors; and
one or more storage devices that store instructions, where the one or more storage devices store three-dimensional map data including reference visual feature points that are located around a movement route for an unmanned vehicle, and
the one or more processors execute the instructions to perform:
matching the reference visual feature points with visual feature points included in a terminal image that includes an unmanned vehicle object indicating the unmanned vehicle and includes the visual feature points, thereby identifying the unmanned vehicle indicated by the unmanned vehicle object that is included in the terminal image, where the terminal image is provided from a terminal device that includes a display; and
superimposing and displaying, in real time, one or more augmented reality (AR)-related objects on the terminal image displayed on the display, where the one or more AR-related objects indicate related information related to movement of the identified unmanned vehicle.

[Clause 2]
The display control device according to clause 1, where the three-dimensional map data is available in a visual positioning system (VPS).

[Clause 3]
The display control device according to clause 1 or 2, where
the one or more storage devices store a database in association with an unmanned vehicle identifier assigned to the unmanned vehicle, where the database manages the related information, the three-dimensional map data is associated with global navigation satellite system (GNSS) coordinates, and the one or more processors execute the instructions to further perform:

determining the unmanned vehicle identifier of the unmanned vehicle indicated by the unmanned vehicle object included in the terminal image, based on GNSS coordinates obtained from the unmanned vehicle and GNSS coordinates in the terminal image obtained from the matching; and superimposing and displaying, in real time, the AR-related objects on the terminal image displayed on the display, where the AR-related objects indicate the related information associated with the determined unmanned vehicle identifier.

[Clause 4]

The display control device according to any one of clauses 1 to 3, where the one or more AR-related objects include a traveling direction display object that extends from the unmanned vehicle object in a traveling direction of the unmanned vehicle object, and the one or more processors execute the instructions to further perform superimposing and displaying, in real time, the traveling direction display object on the terminal image displayed on the display.

[Clause 5]

The display control device according to any one of clauses 1 to 4, where the one or more AR-related objects include a warning display object indicating a restricted area, and the one or more processors execute the instructions to further perform superimposing and displaying, in real time, the warning display object on an area that is located in a traveling direction of the unmanned vehicle object of the terminal image displayed on the display.

[Clause 6]

The display control device according to any one of clauses 1 to 5, where the one or more AR-related objects include a speed display object indicating a movement speed of the unmanned vehicle, and the one or more processors execute the instructions to further perform superimposing and displaying, in real time, the speed display object on the terminal image displayed on the display.

[Clause 7]

The display control device according to any one of clauses 1 to 6, where the one or more AR-related objects include a map object including a route object that indicates the movement route, and the one or more processors execute the instructions to further perform superimposing and displaying, in real time, the map object on the terminal image displayed on the display.

[Clause 8]

The display control device according to clause 7, where the one or more processors execute the instructions to further perform superimposing and displaying, in real time, a current position object on the map object, where the current position object indicates a current position of the unmanned vehicle.

[Clause 9]

The display control device according to any one of clauses 1 to 8, where the one or more processors execute the instructions to further perform superimposing and displaying, in real time, one or more AR additional objects on the terminal image displayed on the display, where the AR additional objects indicate additional information associated with at least one of the reference visual feature points.

[Clause 10]

The display control device according to any one of clauses 1 to 9, where the one or more processors execute the instructions to further perform communication with at least one of the unmanned vehicle and the terminal device by using a mobile communications system.

[Clause 11]

A display control method including:

matching, by one or more computers, three-dimensional map data that includes reference visual feature points located around a movement route for an unmanned vehicle with visual feature points included in a terminal image that includes an unmanned vehicle object indicating the unmanned vehicle, thereby identifying the unmanned vehicle indicated by the unmanned vehicle object that is included in the terminal image, where the terminal image is provided from a terminal device that includes a display; and superimposing and displaying, by the one or more computers, in real time, one or more AR-related objects on the terminal image displayed on the display, where the one or more AR-related objects indicate related information related to movement of the identified unmanned vehicle.

[Clause 12]

One or more programs, where the one or more programs include instructions that, when executed on a computer, cause the computer to perform:

matching three-dimensional map data that includes reference visual feature points located around a movement route for an unmanned vehicle with visual feature points included in a terminal image that includes an unmanned vehicle object of the unmanned vehicle and the visual feature points, thereby identifying the unmanned vehicle indicated by the unmanned vehicle object that is included in the terminal image; and superimposing and displaying, in real time, one or more AR-related objects on the terminal image displayed on a display of the display, where the one or more AR-related objects indicate related information related to movement of the identified unmanned vehicle.

[Clause 13]

A terminal device including:

a camera configured to capture an unmanned vehicle;

a display;

one or more processors; and one or more memories that store instructions, where the one or more processors execute the instructions to perform:

generating a terminal image to which an unmanned vehicle object has been added, the unmanned vehicle object indicating the unmanned vehicle on an image captured by the camera;

sending the terminal image to the display control device;

receiving a command for superimposing and displaying one or more AR-related objects on the terminal image displayed on the display, where the one or more AR-related objects indicate related information related to movement of the unmanned vehicle; and superimposing and displaying, in real time, the one or more AR-related objects on the terminal image according to the command, where the terminal image is displayed on the display.

[Clause 14]

A display control method including:

generating a terminal image from an image obtained by capturing an unmanned vehicle by a terminal device that includes a display, where the terminal image includes an unmanned vehicle object indicating an unmanned vehicle;

sending, to a display control device, the terminal image generated by the terminal device;

receiving, by the terminal device, a command for superimposing and displaying one or more AR-related objects on the terminal image displayed on the display, where the one or more AR-related objects indicate related information related to movement of the unmanned vehicle; and superimposing and displaying, in real time, the one or more AR-related objects on the terminal image according to the command, where the terminal image is displayed on the display.

[Clause 15]

One or more programs, where the one or more programs include instructions that, when executed on a terminal device including a display, cause the terminal device to perform:

generating a terminal image from an image obtained by capturing an unmanned vehicle, where the terminal image includes an unmanned vehicle object indicating an unmanned vehicle;

sending the generated terminal image to the display control device;

receiving a command for superimposing and displaying one or more AR-related objects on the terminal image, where the one or more AR-related objects indicate related information related to movement of the unmanned vehicle; and superimposing and displaying, in real time, the one or more AR-related objects on the terminal image according to the command, where the terminal image is displayed on the display.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A display control device, comprising:

one or more storage devices configured to store computer program code, wherein the one or more storage devices store three-dimensional map data including reference visual feature points that are located around a movement route for an unmanned vehicle, and at least one processor configured to access the one or more storage devices and operate according to the computer program code, the computer program code including:

match code configured to cause at least one of said at least one processor to match the reference visual feature points with visual feature points included in a terminal image that includes an unmanned vehicle object indicating the unmanned vehicle and includes the visual feature points, thereby identifying the unmanned vehicle indicated by the unmanned vehicle object that is included in the terminal image, wherein the terminal image is provided from a terminal device that includes a display; and transmit code configured to cause at least one of said at least one processor to transmit, in real time, a command for superimposing and displaying one or more augmented reality (AR)-related objects on the terminal image displayed on the display, wherein the one or more AR-related objects indicate related information related to movement of the identified unmanned vehicle.

2. The display control device according to claim 1, wherein the three-dimensional map data is available in a visual positioning system (VPS).

3. The display control device according to claim 1, wherein the one or more storage devices store a database in association with an unmanned vehicle identifier assigned to the unmanned vehicle, wherein the database manages the related information, the three-dimensional map data is associated with global navigation satellite system (GNSS) coordinates, and the computer program code further includes:

determine code configured to cause at least one of said at least one processor to determine the unmanned vehicle identifier of the unmanned vehicle indicated by the unmanned vehicle object included in the terminal image, based on GNSS coordinates obtained from the unmanned vehicle and GNSS coordinates in the terminal image obtained from the matching, wherein the AR-related objects indicate the related information associated with the determined unmanned vehicle identifier.

4. The display control device according to claim 1, wherein the one or more AR-related objects include a traveling direction display object that extends from the unmanned vehicle object in a traveling direction of the unmanned vehicle object, and the transmit code is further configured to cause at least one of said at least one processor to transmit, in real time, a command for superimposing and displaying, in real time, the traveling direction display object on the terminal image displayed on the display.

5. The display control device according to claim 1, wherein the one or more AR-related objects include a warning display object indicating a restricted area, and the transmit code is further configured to cause at least one of said at least one processor to transmit, in real time, a command for superimposing and displaying, in real time, the warning display object on an area that is located in a traveling direction of the unmanned vehicle object of the terminal image displayed on the display.

6. The display control device according to claim 1, wherein the one or more AR-related objects include a speed display object indicating a movement speed of the unmanned vehicle, and the transmit code is further configured to cause at least one of said at least one processor to transmit, in real time, a command for superimposing and displaying, in real time, the speed display object on the terminal image displayed on the display.

7. The display control device according to claim 1, wherein the one or more AR-related objects include a map object including a route object that indicates the movement route, and the transmit code is further configured to cause at least one of said at least one processor to transmit, in real time, a command for superimposing and displaying, in real time, the map object on the terminal image displayed on the display.

8. The display control device according to claim 7, wherein the transmit code is further configured to cause at least one of said at least one processor to transmit, in real time, a command for superimposing and displaying, in real time, a current position object on the map object, wherein the current position object indicates a current position of the unmanned vehicle.

9. The display control device according to claim 1, wherein the transmit code is further configured to cause at least one of said at least one processor to transmit, in real time, a command for superimposing and displaying, in real time, one or more AR additional objects on the terminal image displayed on the display, wherein the one or more AR additional objects indicate additional information associated with at least one of the reference visual feature points.

10. The display control device according to claim 1, wherein the computer program code further including communication code configured to cause at least one of said at least one processor to communicate with at least one of the unmanned vehicle and the terminal device by using a mobile communications system.

11. A display control method, comprising:

matching, by one or more computers, three-dimensional map data that includes reference visual feature points located around a movement route for an unmanned vehicle with visual feature points included in a terminal image that includes an unmanned vehicle object indicating the unmanned vehicle, thereby identifying the unmanned vehicle indicated by the unmanned vehicle object that is included in the terminal image, wherein the terminal image is provided from a terminal device that includes a display; and transmitting a command for superimposing and displaying, by the one or more computers, in real time, one or more AR-related objects on the terminal image displayed on the display, wherein the one or more AR-related objects indicate related information related to movement of the identified unmanned vehicle.

12. A display control method, comprising:

generating, by a terminal device, a terminal image from an image obtained by capturing an unmanned vehicle, wherein the terminal device includes a display, and the terminal image includes an unmanned vehicle object indicating an unmanned vehicle;

sending, by the terminal device, the terminal image generated by the terminal device to a display control device;

receiving, by the terminal device, a command for superimposing and displaying one or more AR-related objects on the terminal image displayed on the display, wherein the AR-related objects indicate related information related to movement of the unmanned vehicle identified by matching reference visual feature points included in a three-dimensional map data held by the display control device with visual feature points included in the terminal image, and the command was transmitted by the display control device; and superimposing and displaying, in real time by the terminal device, the one or more AR-related objects on the terminal image according to the command, wherein the terminal image is displayed on the display.

* * * * *